United States Patent

[11] 3,612,484

| [72] | Inventors | Arthur A. Gallagher<br>Bryn Mawr, Pa.;<br>Edward A. Gallagher, III, Timonium, Md. |
|---|---|---|
| [21] | Appl. No. | 789,187 |
| [22] | Filed | Jan. 6, 1969 |
| [45] | Patented | Oct. 12, 1971 |
| [73] | Assignee | National Steel Erecting Corp.<br>Philadelphia, Pa. |

[54] APPARATUS FOR LIFTING AND TRANSPORTING DISABLED AIRCRAFT
5 Claims, 7 Drawing Figs.

| [52] | U.S. Cl. | 254/2, 254/93 HP, 214/390 |
|---|---|---|
| [51] | Int. Cl. | B60p 3/12 |
| [50] | Field of Search | 214/512, 1 AB, 390; 254/93 HP, 2.2 |

[56] References Cited
UNITED STATES PATENTS

| 2,714,011 | 7/1955 | Albee | 254/93 HP X |
|---|---|---|---|
| 3,174,722 | 3/1965 | Alm | 254/93 HP |
| 3,211,425 | 10/1965 | Greulich et al. | 254/2 (.2) |

FOREIGN PATENTS

| 512,197 | 8/1939 | Great Britain | 254/93 HP |

Primary Examiner—Albert J. Makay

ABSTRACT: A mobile apparatus for lifting and transporting a disabled aircraft without substantially damaging the aircraft, having, in combination, a mobile frame, a support element attached to the frame and at least one inflatable expandable bag secured to the frame, said bag adapted to lift and support the aircraft when inflated and the process for rapidly lifting and transporting a disabled aircraft without substantially damaging the aircraft using at least one of the apparatus of this invention. The apparatus and method of this invention are useful for lifting and for transporting a grounded disabled aircraft.

PATENTED OCT 12 1971 3,612,484
SHEET 1 OF 4
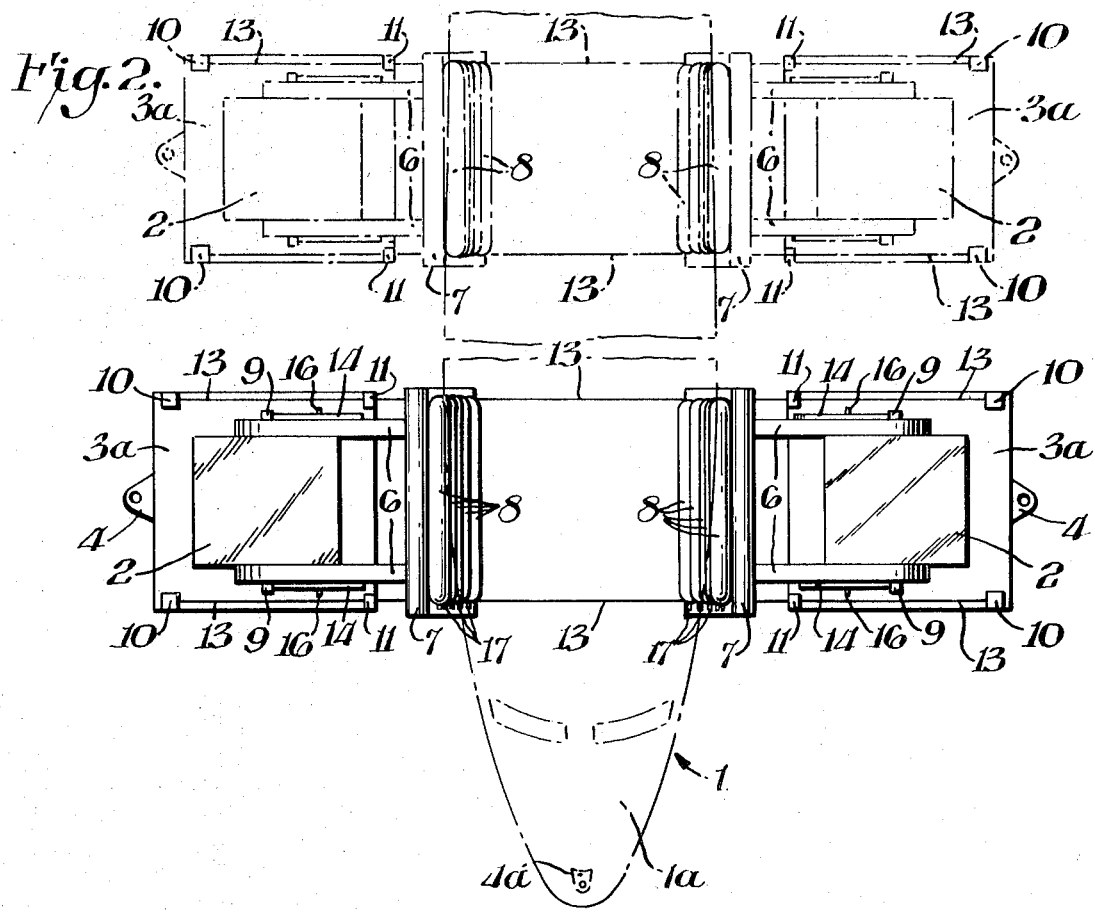
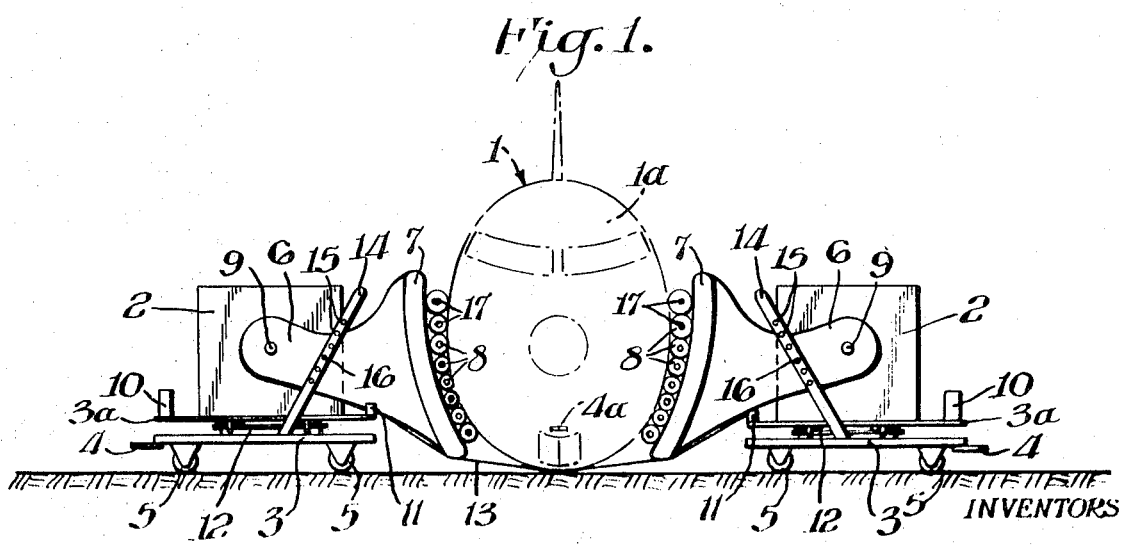
INVENTORS
Arthur A. Gallagher
Edward A. Gallagher, III
BY
Samuel V. Abrams
ATTORNEY

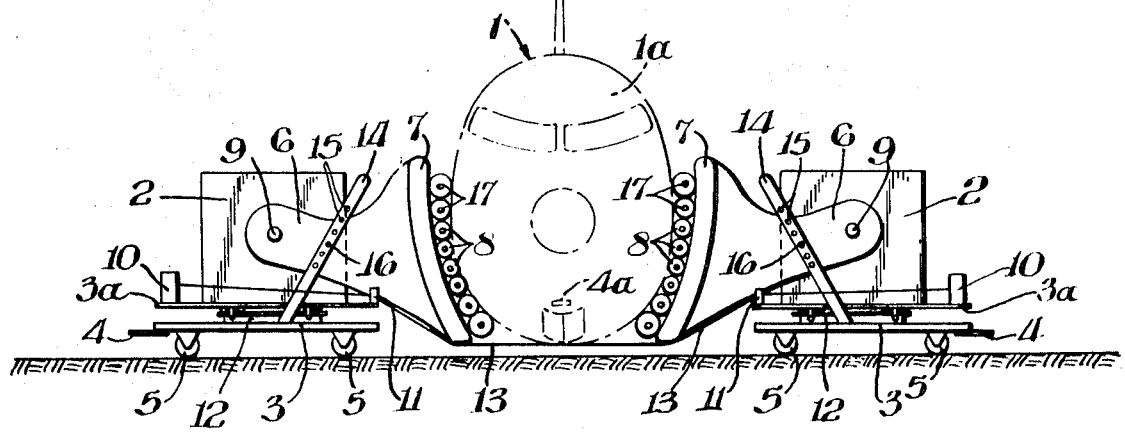
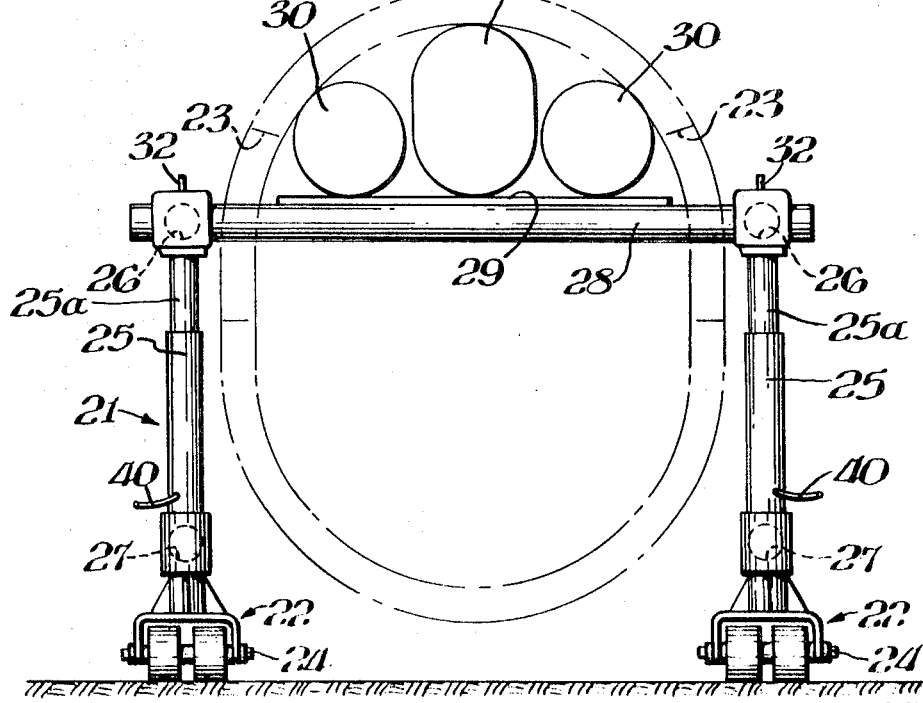

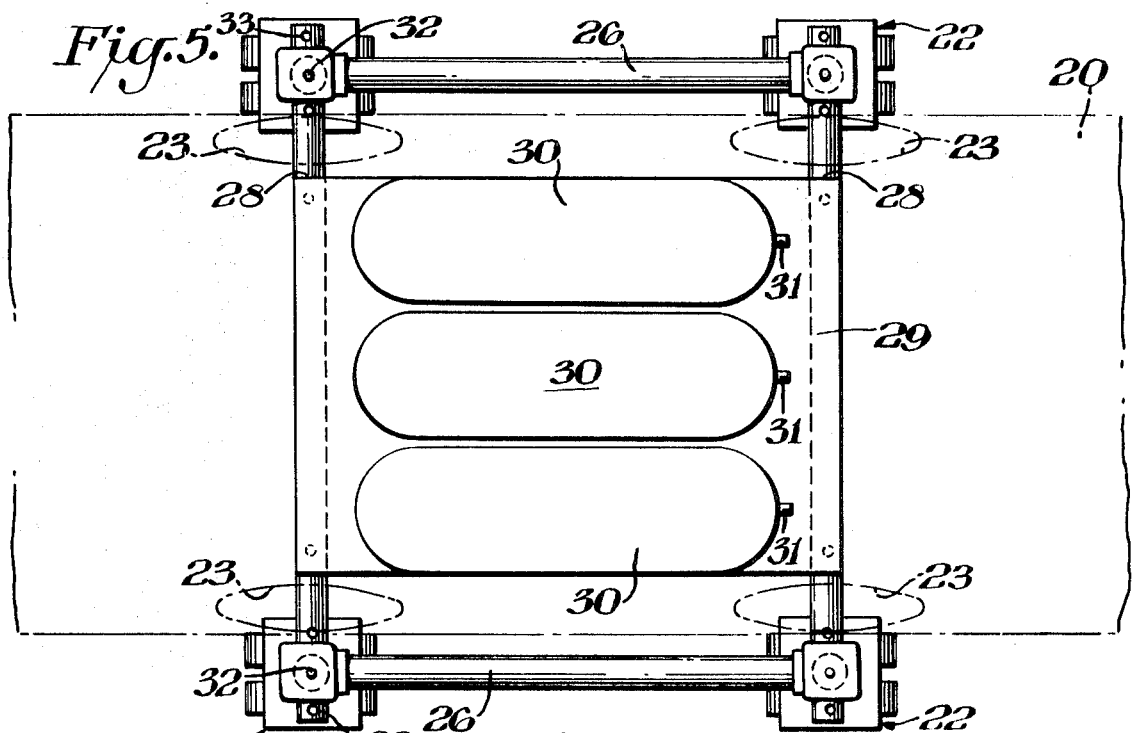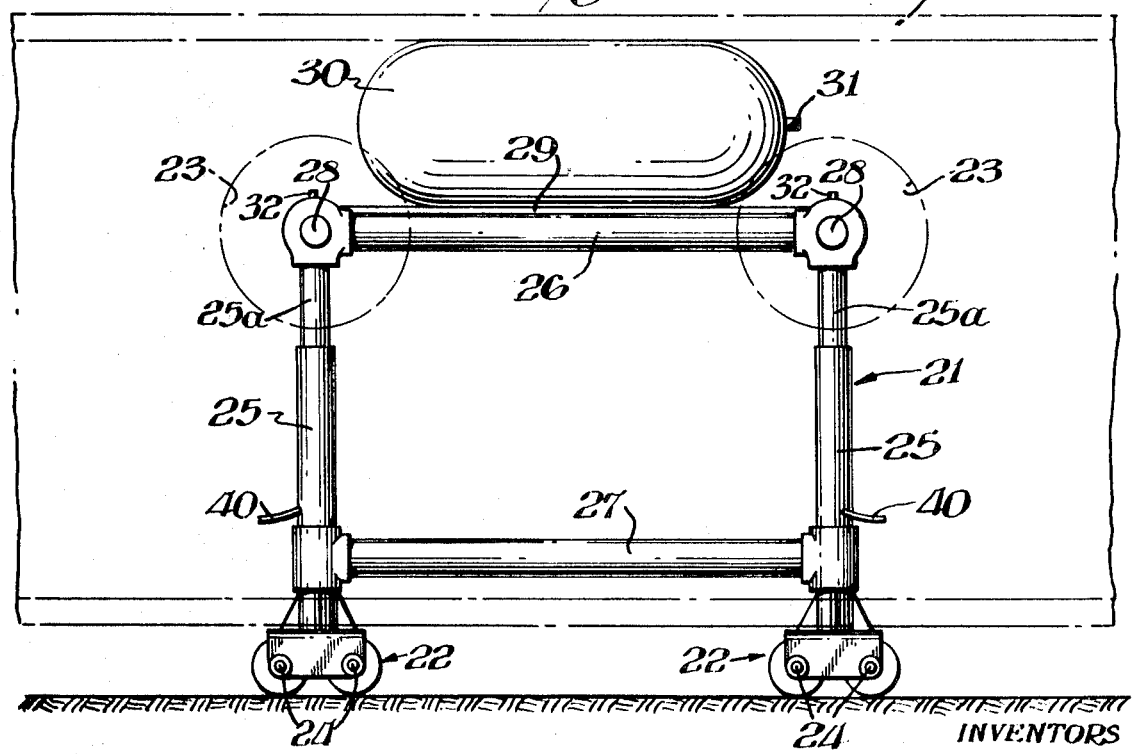

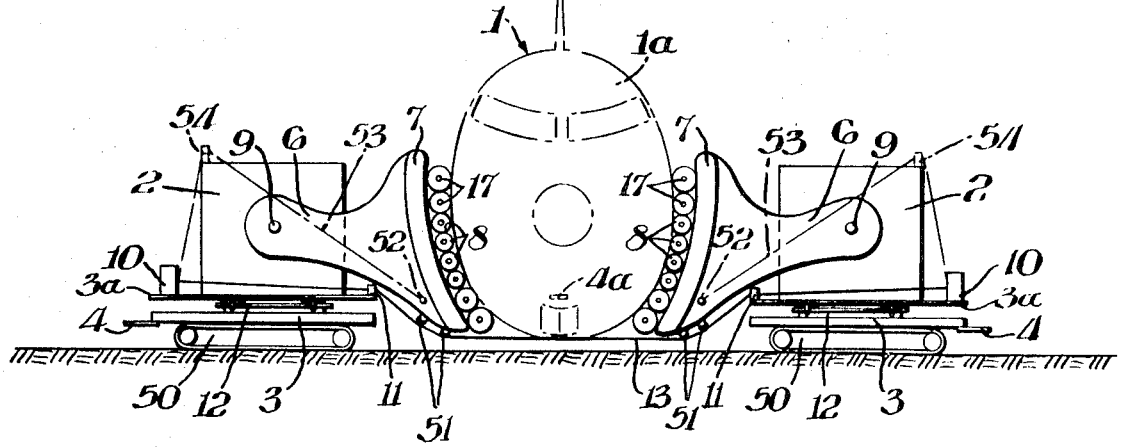

APPARATUS FOR LIFTING AND TRANSPORTING DISABLED AIRCRAFT

FIELD OF THE INVENTION

This invention relates to a mobile apparatus for lifting and transporting grounded disabled aircraft and to a process for lifting and transporting grounded disabled aircraft.

BACKGROUND OF THE INVENTION

The efficient operation of airports requires that runways be available at all times. However, aircraft on landing and taking off may become grounded and disabled on the runway due to landing gear break down. When this happens, the runways may become tied up and unavailable to any other incoming or outgoing aircraft. Such runway tieups produce a number of problems, e.g., the landing and take off schedules are disrupted causing a loss of revenue to airline companies and inconvenience to their passengers. These problems will be even greater when the "jumbo" jet powered aircraft begin service in 1969 or 197. The jet powered aircraft are considerably larger and heavier than their predecessors and present serious handling problems when their landing gears collapse. Conventional hauling equipment available today is not capable of rapidly removing a disabled "jumbo" jet from a runway without causing substantial damage to it. In addition, this problem will be enhanced since the "jumbo" jet's greater weight will require specially constructed runways capable of supporting them. The number of these special runways will be limited in number for some time. Thus, landing gear break down of a "jumbo" jet on the special runway required would seriously disrupt the schedules of the other aircraft using the special runway.

Presently, grounded disabled aircraft are removed from runways by hoisting them from the ground using various conventional lifting devices. Although these methods are operative, they are known to do substantial damage to the fuselage of the aircraft.

An object of this invention is an apparatus for lifting, supporting and transporting a grounded disabled aircraft without substantially damaging the aircraft.

It is an object of the apparatus of this invention to provide a jacklike device for lifting a disabled aircraft from the ground and transporting said aircraft.

Another objective of the apparatus aspect of this invention is to provide an apparatus capable of lifting and transporting the disabled aircraft away from the runway relatively rapid (within a period of time of about 10 hours and preferably within a period of 4 to 6 hours more or less) and without causing substantial damage to the aircraft.

A more specific object of the present invention is to provide an apparatus which can be used in pairs to lift, cushion, support and transport a grounded disabled aircraft. This apparatus comprises a mobile frame having a support element operatively attached to the frame and at least one expandable inflatable bag attached to the support element adapted to be placed against the exterior side of the fuselage. The aircraft is lifted from the ground by the lifting force directed against the lower sides of the fuselage when the bag is inflated and expanded.

Another more specific object of the present invention is to provide an apparatus which can be used to lift, cushion, support and transport a grounded disabled aircraft comprising a mobile frame having a support element operatively attached to the frame and adapted to be placed inside of the aircraft and at least one expandable inflatable bag attached to the support element adapted to be placed against the interior side of the fuselage. The aircraft is lifted from the ground by the lifting force directed against the top interior side of the fuselage.

Still another object of the invention is to provide an apparatus for lifting and transporting disabled aircraft wherein the towing means for moving the apparatus can either be a separate unit or can be incorporated as a component of the apparatus combination.

Another object of the invention is to provide an apparatus for lifting, supporting and transporting a disabled aircraft wherein the aircraft is supported and partially lifted from the ground by an expandable inflatable bag and wherein additional lifting means is provided by an associated lifting means.

It is a further object of the invention to provide a process for lifting and transporting a grounded disabled aircraft rapidly and without substantially damaging the aircraft using at least one of the apparatus of this invention.

SUMMARY OF THE INVENTION

This invention in its apparatus aspect is directed to an apparatus which singly or in combination with one or more other mobile apparatus of this invention is suitable for lifting, supporting and transporting a grounded disabled aircraft, which comprises, in combination, a mobile frame, a support element mounted on the frame, at least one inflatable expandable bag having a valve means for inflating the bag by an associated compressed fluid means or a source of a compressed fluid, said bag being secured to the support element, said bag being adapted for positioning either on an interior or exterior portion of the aircraft fuselage and capable of lifting and supporting the aircraft when the bag is inflated without substantially damaging the aircraft, lifting means for further lifting the aircraft, and a towing means operatively connected to the apparatus or to the aircraft for towing the aircraft.

This invention in its process aspect is directed to the process for lifting, supporting and transporting a grounded disabled aircraft which comprises the steps, in sequence:

a. positioning either on or within the aircraft, in a lifting position at least one mobile apparatus of this invention having mounted thereto a support element having at least one inflatable bag secured thereto;

b. inflating said bag with a source of fluid by a valve means mounted on the bag to lift and support said aircraft above the support element without substantially damaging the aircraft; and c. towing the aircraft by a towing means operatively connected to the aircraft or to the apparatus.

Alternatively an additional step in the process comprising lifting the supported aircraft by a lifting means operatively attached to the apparatus can be used.

The apparatus and method of this invention are useful for lifting, supporting and transporting a grounded disabled aircraft.

DESCRIPTION OF THE PREFERRED EMBODIMENTS

The invention is illustrated in the accompanying drawings, in which:

FIG. 1 is a front elevational view of an airplane with a pair of opposed mobile apparatus of this invention for use on the exterior of the airplane positioned adjacent to the airplane in the down or at rest position;

FIG. 2 is a top plan view of a section of the airplane with two pair of opposed mobile apparatus shown in FIG. 1 positioned adjacent to the airplane;

FIG. 3 is a front elevational view of the airplane with a pair of opposed mobile apparatus positioned adjacent to the airplane in the raised or lift position;

FIG. 4 is a side elevational view of another modification of this invention of the mobile apparatus used in the interior of the airplane positioned about the airplane;

FIG. 5 is a top plan view of the modification of FIG. 4 showing the positioning of the mobile apparatus in the interior of the airplane and also showing expandable inflatable bags in position against the top interior of the airplane;

FIG. 6 is a front elevational view of the modification of FIGS. 4 and 5, showing expandable inflatable bag in place; and FIG. 7 is a front elevational view of another modification of the apparatus of FIGS. 1, 2 and 3 showing additional lifting means.

The mobile apparatus of this invention are of two types:

1. a modification to lift a grounded disabled airplane by applying the lifting fore of the expandable inflatable bag on the lower side of the exterior of the fuselage (FIGS. 1, 2 and 3 and 7) and
2. a modification to lift a disabled aircraft by applying the lifting force of the expandable inflatable bag on the upper side of the interior of the fuselage (FIGS. 4, 5 and 6). In the method of lifting and transporting a grounded disabled airplane with either of these apparatus, the bag is placed in position where the expanding inflating bag produces a lifting force against the airplane, which lifts it from the ground.

In the modification used on the exterior of the airplane the bag or bags, when more than one bag is used, is positioned on the underside of the fuselage. In the modification used in the interior of the airplane, the bag or bags are placed on the top inner side of the fuselage.

Referring now to FIGS. 1, 2, 3 and 7, the grounded aircraft 1 to be lifted from the ground, supported and transported, shown in phantom outline, has a fuselage 1a. The mobile apparatus has a frame 2 mounted to a mobile platform 2a pivotally mounted to a platform 3 by means of a fifth wheel 12. In the embodiment shown pairs of apparatus are placed in opposed position adjacent to the aircraft. The ground engaging wheels 5 of the apparatus can be any wheel or multiple wheel means which can be fixed or on casters which can be guided or swivel or rotate. The wheeled platform can be a dolly. This wheel means can be replaced by tractor crawlers 50 shown in FIG. 7 or skids. An extension 6 is pivotally mounted on pin 9 secured to the frame. A support member 7 consisting of a convex plate is mounted on the end of the extension 6. Secured to the support member 7 by bolts (not shown) or by other securing means are expandable inflatable resilient bags 8. The bags 8 are equipped with a valve 17. The opposed apparatus are coupled by one or more cables 13. These cables 13 are operatively connected by one or more winches 10 mounted on platform 2a. The cable is directed over the platform by a sheave 11. The pivoting action of the extension and support member is restricted by means of a locking arm 14 mounted on platform 2a and a locking pin 15. The locking arm contains a series of holes 15 through which the locking pin passes. The locking pin passes through holes (not shown) disposed in the extension 6 to coincide with the holes in the locking arm. The mobile apparatus is towed by a towing means such as a tractor or an engine operatively connected by a power train to the wheels mounted on one or more of the apparatus. The towing means is shown to be operatively connected by the towing bar 4 or 4a. Alternately, as shown in FIG. 2, a pair of extensions 6 are each pivotally mounted on the frame 2. The support member 7 is mounted on the extensions. A pair of locking arms 14 are disposed adjacent to the extensions to provide additional stability to this modification. The support element referred to above is, in this case, a combination of the extension 6 and the support member 7.

Referring to FIGS. 4, 5 and 6, the grounded aircraft 20 to be lifted from the ground, supported and transported is shown in phantom outline. The exterior frame assembly 21 consisting of a vertical cylindrical support members 25 having telescopically therein is a vertical shaft and upper horizontal brace 26 and a lower horizontal brace 27. The cylindrical support member and the shaft in combination, operates as a hydraulic pump when operated by a hydraulic line 40. Horizontal support members 28 project through the aircraft through opposite pairs of aircraft windows 23 but not necessarily through adjacent aircraft windows. The ground engaging wheel assembly 22 is mounted for rolling around an axle 24. The horizontal support members 28 are detachably connected to the wheel assembly 21 and secured thereto by a locking pin 32 which passes through holes 33 in the wheel assembly disposed to receive the locking pin 32. Resilient expandable inflatable bags 30, having a valve 31, are secured to an upper surface of the support platform 29. The support element referred to above is, in this case, the support platform 29.

Referring to FIG. 7, which is a modification of the apparatus shown in FIGS. 1, 2 and 3 having an additional means for lifting the supported aircraft, mounted on the mobile platform 2 by means of a platform 2a and a fifth wheel 12 is a frame 2. The apparatus is mobile by means of tractor crawlers 50. Lifting force is provided by a pulley assembly consisting of winch 10, sheave 54, cable 53 and cable terminal 52 mounted on a lower portion of the extension 6. Additional lifting force is achieved by means of the coupling means by the upward force produced by the cable 13 passing through a pair of sheaves 51 mounted on the bottom of the extension.

The lifting component of the apparatus of this invention includes an expandable inflatable bag. One or more of these expandable inflatable bags can be used on each of the apparatus. Alternately, a single bag, or a single bag having a compartmental design, can be used. For best results it is convenient to use more than one bag. When more than one bag is used, the bags can be interconnected with a system of hoses and valves which allow a stepwise or successive inflation of the bags. For example, in the modification used on the exterior of the aircraft, the lowest bag is inflated or partially inflated to expand or partially expand it, then the next adjacent bag is inflated or partially inflated, etc. This partial stepwise inflation and expansion of the bags can be repeated until the aircraft is lifted or raised to a desired height off the ground and the airplane can be towed. The partial inflation of the bags can be controlled by the pressure of the inflating fluid.

Alternatively, the mobile apparatus equipped with pneumatic tires can be positioned adjacent to the aircraft with the tires partially deflated. The tires are then inflated to provide an additional source of the desired lifting force to raise the aircraft from the ground.

The bag or bags are equipped with a valve means. This valve means can be any pressure valve such as those used in pneumatic automobile tires which are well known to one skilled in the art.

The bag can be constructed of a resilient material such as rubber, polyurethane, steel and fiber reinforced rubber and the like.

The bags are inflated by a fluid means. Compressed air is preferred because of its availability, convenience and low cost. However, other fluids can be used such as nitrogen and the like. Compressed air for this purpose can be obtained by an ordinary air compresser which is well known in the art.

Opposed pairs of the apparatus used on the exterior of the aircraft can be disposed near its center of gravity to balance the aircraft as it is lifted and supported. Alternately, two or more opposed pairs of apparatus can be used to balance the aircraft as it is lifted or an odd number of mobile apparatus greater than two, can be used.

The mobile frame used in the invention used on the exterior of the aircraft can be any of the wheeled dollies commonly known in the transportation of heavy machinery. Simple dollies are operative but as the weight of the aircraft is put onto the mobile apparatus its force is directed toward the wheel closest to the aircraft. Although a simple dolly would be operative, in practice, it would be more convenient to use a dolly equipped with a fifth wheel. It is preferable that the dolly is provided with a means for compensating the weight of the aircraft as the aircraft is lifted. It is therefore preferable to have a means for shifting the force of the weight over more of the wheels of the mobile apparatus. Such weight compensating means including automatic weight compensating means are well known and are being employed in devices such as cranes, i.e., to compensate the load being lifted by the crane. This weight compensation can be accomplished by having the platform of the dolly mounted so that as the aircraft is lifted, the platform can be moved toward the aircraft. This accomplishes the desirable result of distributing the weight of the lifted aircraft over more of the wheels of the mobile apparatus. Alternately, the center of gravity can be shifted in the same manner such as that used in cranes to compensate for the load being lifted. This latter method using a hydraulic system is also well known in the art.

The initial lifting and supporting of the aircraft is provided by the expandable inflatable bags. Additional lifting means can be provided to the apparatus to provide further lifting action to the bag lifted and supported aircraft. The bag or bags provide, in addition to a limited amount of lifting action, a cushioning action to support the aircraft. The additional lifting means is operatively attached to apparatus. For example, in FIG. 7 additional lifting action is obtained by a cable-pulley assembly 52, 53 and 54 and in FIGS. 4, 5 and 6 additional lifting action is obtained by the piston cylinder 25, hydraulic piston and a source of compressed fluid to drive the piston cylinder by means of the hydraulic line 40. Other lifting means can be used to provide the desired additional lifting action.

The support member shown in FIGS. 1, 2, 3 and 7 can be approximately circular or convex to be formfitting with the exterior the aircraft. The area of the upper surface of the support member which is placed immediately adjacent to the aircraft must be sufficiently large to support the aircraft without substantially damaging the aircraft. The support member can have a vertical dimension of up to 20 feet or greater and a horizontal dimension of up to 30 feet or greater. The factors upon which the dimensions of support member are based is the weight of the aircraft and the weight supporting capacity of the fuselage.

Preferably, using the embodiments of this invention the aircraft is lifted about 1 to 3 inches or more off the runway or ground. More preferred, the aircraft is lifted or raised 3 to 6 inches or more. Most preferably the aircraft is lifted or raised 6 to 10 inches or more from the level of the runway or ground.

The towing means for towing the lifted aircraft can be a tractor having a cable attached by means of a towing bar attached to the aircraft. Also, the cable can be attached to a pair of opposed mobile apparatus. Alternately, the apparatus can be towed by means of a gasoline or diesel engine operatively connected by means of a power train to a wheel or wheels of the mobile apparatus.

Opposed apparatus of this invention can be coupled together to frame them from separating as the aircraft is lifted, supported and towed. The coupling can be accomplished by any coupling means. In FIGS. 1, 2, 3 and 7 the coupling means are cables 13 driven by a winch. In the process embodiment of this invention, it is convenient to draw a cable under the aircraft, position both mobile apparatus and then couple them prior to inflation of the bag or bags. As the aircraft is lifted, any slack in the cable is taken up. Alternately, the mobile apparatus can be positioned and the bag or bags inflated prior to coupling. In the latter case, it will be necessary to prevent the mobile frame from sliding away from the aircraft as the bag or bags are inflated.

The aircraft supported by the apparatus of this invention can be moved in the forward, reverse or sideways direction with equal efficiency, depending upon the design of the wheeled portion of the apparatus.

The aircraft to be transported will vary in size and weight. The airplanes can weigh up to 3000,000 to 800,000 pounds and more depending upon whether they are loaded. The fuselage of these aircraft are about 20–60 feet or more in diameter. Preferably, each mobile jack is capable of lifting the weight of the aircraft. When more than one apparatus is to be used, the lifting capacity of each apparatus can be up to 200,000 pounds of greater.

Within the definition of aircraft are airplanes including jet, "jumbo" jet, turboprop and propeller driven airplanes. An aircraft is any of the weight carrying structures that is driven by a screw propeller or by a high velocity jet and supported by the dynamic reaction of the air against its wings.

The construction of the fuselage of aircraft is well known in the art. In order to further minimize the damage to the aircraft when it is necessary to transport them by an apparatus of this invention, it may be convenient to install points of support in the fuselage. These points of support would be placed at various locations on the fuselage.

The apparatus and process of this invention are useful for lifting, supporting and transporting grounded disabled aircraft rapidly and without substantially damaging the aircraft. Until the invention of the apparatus and process of this invention, it was not possible to accomplish these results.

In view of this disclosure, other modifications will occur to those skilled in the art. According to the provisions of the patent statutes, we have explained the principle of our invention and have illustrated and described what we now consider to represent its best embodiment. However, we desire to have it understood, that within the scope of the claims, the invention may be practiced otherwise than specifically illustrated and described.

The embodiments of the invention in which an exclusive property or privilege is claimed are defined as follows:

1. A mobile apparatus for supporting, lifting and transporting a grounded disabled aircraft which comprises, in combination,
   a. a mobile frame having a ground engaging wheel means for moving the aircraft, supported on the apparatus,
   b. an extension pivotally mounted on the frame
   c. a support member mounted on the extension adapted to support the aircraft, comprising of a convex plat contoured to be approximately form fitting with a lower portion of the exterior of the aircraft fuselage,
   d. at least one resilient expandable inflatable bag secured on upper surface of the support member having a valve means for expanding and inflating the bag and said bag being adapted for positioning under a lower portion of the fuselage of the aircraft and for lifting the aircraft when expanded and inflated by a source of compressed fluid.

2. The apparatus of claim 1 wherein a plurality of expandable inflatable bags are secured to an upper surface of the support member.

3. The apparatus of claim 1 comprising a wheeled platform and a frame mounted to a platform pivotally mounted to the wheeled platform by a fifth wheel means.

4. The apparatus of claim 1 having a pair of extensions pivotally mounted to the frame and a support member mounted to the pair of extensions.

5. The apparatus of claim 1 having a locking means to lock the extension in a lifting position.